United States Patent [19]

Ortega et al.

[11] Patent Number: 6,144,958

[45] Date of Patent: Nov. 7, 2000

[54] SYSTEM AND METHOD FOR CORRECTING SPELLING ERRORS IN SEARCH QUERIES

[75] Inventors: Ruben Ernesto Ortega, Seattle; Dwayne Edward Bowman, Woodinville; Michael L. Hamrick, Seattle; Joel R. Spiegel, Woodinville; Timothy R. Kohn, Seattle, all of Wash.

[73] Assignee: Amazon.com, Inc., Seattle, Wash.

[21] Appl. No.: 09/115,662

[22] Filed: Jul. 15, 1998

[51] Int. Cl.[7] .................................................. G06F 17/30
[52] U.S. Cl. ................................. 707/5; 707/6; 707/10
[58] Field of Search ................................. 707/5, 1–4, 6, 707/10, 510, 513; 709/217–219

[56] References Cited

U.S. PATENT DOCUMENTS

| | | | |
|---|---|---|---|
| 5,640,553 | 6/1997 | Schultz | 707/5 |
| 5,826,261 | 10/1998 | Spencer | 707/5 |
| 5,875,443 | 2/1999 | Nielsen | 707/2 |
| 5,920,859 | 7/1999 | Li | 707/5 |

FOREIGN PATENT DOCUMENTS

WO 95/29451  11/1995  WIPO ..................................... 17/30

OTHER PUBLICATIONS

"Discover: A Resource Discovery System Based on Content Routing," by Sheldon et al., Computer Networks and ISDN Systems, vol. 27, No. 6, pp.953–972, Apr. 1995.

A Survey of Information Retrieval and Filtering Methods, Faloutsos and Oard, Univ. of Maryland, 22 pages (undated), Date unknown.

*A Corpus Analysis Approach for Automatic Query Expansion,* Gauch and Wang, Proceedings of the 6th International Conference on Information and Knowledge Mangement, pp. 278–284 (1997).

*Discovering Web Access Patterns and Trends by Applying OLAP and Data Mining Technology on Web Logs,* Zaiane, Xin and Han, IEEE Internat. Forum on Research and Technology Advances in Digital Libraries (ADL '98), pp. 19–29 (1998).

*Phonetic String Matching: Lessons From Information Retrieval, Zobel and Dart,* Proceedings of the 19th Annual International ACM SIGIR Conference on Research and Development in Information Retrieval, pp. 166–172 (1996).

Techniques for Automatically Correcting Words in Text, Kukich, ACM Computing Surveys, vol. 24, No. 4, pp. 377–438 (1992).

Handling Spelling Errors in Online Catalog Searches, Drabenstott and Weller, Library Resources & Technical Services, vol. 40, No. 2 (1996).

*Primary Examiner*—Hosain T. Alam
*Attorney, Agent, or Firm*—Knobbe, Martens, Olson & Bear, LLP

[57] ABSTRACT

A search engine is disclosed that uses correlations between search terms to correct misspelled terms within search queries. The correlations are based at least in-part on historical query submissions to the search engine. Preferably, the correlations reflect the frequencies with which the search terms have historically appeared together within the same query, and are stored within a correlation table using related terms lists. In one embodiment, the correlation table is generated periodically from the M (e.g. 10) most recent days of entries in a query log, and thus reflects the current preferences of users. In operation, when a query that includes both matching and non-matching search terms is submitted to the search engine, a spelling correction process accesses the correlation table to generate a list of terms that are deemed to be related to the matching term(s). The spellings of these related terms are then compared to the spelling of each non-matching term using a spelling comparison function that compares two character strings and generates a similarity score. If a suitable replacement is found for a given non-matching term, the non-matching term is replaced with the similar related term. The modified query is then used to perform the search, and the user is notified of the modification(s) made to the query. In the disclosed embodiment, the search engine is used on the Web site of an online merchant to assist users in locating book titles, music titles, and other types of products.

31 Claims, 6 Drawing Sheets amazon.com Book Search

Enter Author and/or Title

Author: [_____] ~42
⦿ Exact Name   ○ Last, First Name   ○ Start of Last Name

Title: [_____] ~43
○ Exact Title   ⦿ Title Word(s)   ○ Start(s) of Title Words

[Search Now]  [Clear the Form]

Author Search Tips / Title Search Tips

---

Search by Subject

Subject: [_____] ~44
○ Exact Subject   ○ Start of Subject   ⦿ Subject Word(s)   ○ Start(s) of Subject Word(s)

[Search Now]  [Clear the Form]

Subject Search Tips

---

Other Search Methods:
ISBN, Publisher/Date, Quick Search

Amazon.com Home | Music Search | Your Account

FIG.2

| COSMOS | JAVA | BIKE | ... |
|---|---|---|---|
| ASTRONOMY (210) | PROGRAMMING (320) | TRAIL (280) | |
| SAGAN (180) | COFFEE (240) | REPAIR (190) | |
| UNIVERSE (111) | API (120) | MOUNTAIN (85) | ... |
| SPACE (110) | LANGUAGE (118) | SCHWINN (66) | |
| CARL (90) | MANAGEMENT (60) | MOAB (19) | |
| ... | ... | ... | |

FIG. 3

```
                Friday, 13-Feb-98 02:23:52
                User Identifier = 29384719287
                HTTP_REFERRER= http://www.amazon.com/book_search_page
100             PATH_INFO=/book_search
                author = Seagal
                title = Human Dynamics
                items_found = 2
                        .
                        .
                        .
                Friday, 13-Feb-98 02:24:11
                User Identifier = 29384719287
102             HTTP_REFERRER= http://www.amazon.com/book_search
                PATH_INFO=/ISBN = 1883823064
                        .
                        .
                        .
                Friday, 13-Feb-98 06:15:03
                User Identifier = 54730543261
                HTTP_REFERRER= http://www.amazon.com/book_search_page
                PATH_INFO=/book_search
                subject = biking China
                items_found = 0
                        .
                        .
                        .
                Friday, 13-Feb-98 10:07:34
                User Identifier = 027385918272
                HTTP_REFERRER= http://www.amazon.com/music_search_page
                PATH_INFO=/music_search
                artist = Miles Davis
                items_found = 22
                        .
                        .
                        .
```

*FIG. 5*

SYSTEM AND METHOD FOR CORRECTING SPELLING ERRORS IN SEARCH QUERIES

APPENDIX AND COPYRIGHT MATERIALS

This specification includes as an appendix a C++ listing of a spelling comparison function used to compare two character strings. The contents of the appendix are subject to copyright protection. The copyright owner has no objection to the facsimile reproduction of the patent document or portions thereof as it appears in the files or records of the U.S. Patent and Trademark Office, but otherwise reserves all rights whatsoever.

FIELD OF THE INVENTION

The present invention relates to information searching and retrieval, and more specifically, relates to methods for processing search queries.

BACKGROUND OF THE INVENTION

Many World Wide Web sites and online services provide search engine programs ("search engines") for assisting users in locating items of interest from a domain of items. For example, Web sites such as AltaVista™ and Infoseek™ provide search engines for assisting users in locating other Web sites, and online services such as Lexis™ and Westlaw™ implement search engines for assisting users in locating articles and court opinions. In addition, online merchants commonly provide search engines for assisting customers in locating items from an online catalog.

To perform a search using a search engine, a user submits a query containing one or more search terms. The query may also explicitly or implicitly identify a record field to be searched, such as the title, author or subject classification of the item. For example, a user of an online bookstore site may submit a query containing terms that the user believes appear in the title of a book. A query server program of the search engine processes the query to identify any items that match the query. The set of items identified by the query server program is referred to as the "query result," and is commonly presented to the user as a list of the located items. In the bookstore example, the query result would typically be the set of book titles that include all of the search terms, and would commonly be presented to the user as a hypertextual listing of these items.

When the user of a search engine misspells a search term within a query, such as by mistyping or failing to remember the term, the misspelled term commonly will not match any of the database terms that are encompassed by the search. In this event, many search engines will simply return a null (empty) search result. Presenting null search results to users, however, can cause significant user frustration. To reduce this problem, some search engines effectively ignore the non-matching term(s) during the search. This strategy has the disadvantage of failing to take into account potentially important information specified by the user, and tends to produce query results that contain relatively large numbers of irrelevant items.

SUMMARY OF THE INVENTION

The present invention addresses the foregoing problems by providing a system and method for correcting misspelled terms within search queries. The system includes a database of correlation data that indicates correlations between search terms. The correlation data is preferably based on the frequencies with which specific search terms have historically appeared together within the same query, and is preferably generated from a query log file. In one embodiment, each entry within the database (implemented as a table) comprises a keyword and a "related terms" list, wherein the related terms list is composed of the terms that have appeared in combination with the keyword with the highest degree of frequency.

The spelling correction method is preferably invoked when a search query is submitted that includes at least one matching term and a least one non-matching term. Using the correlation database, a list of terms that are deemed to be related to the matching term or terms is initially generated. This may be accomplished, for example, by extracting the related terms list for each matching term, and if the query includes multiple matching terms, combining these lists into a single related terms list.

The related terms are then compared in spelling to the non-matching term(s) to identify any suitable replacements. The spelling comparisons are preferably performed using an anagram-type spelling comparison function which generates a score that indicates the degree of similarity between two character strings. If a related term with a sufficiently similar spelling to a non-matching term is found, the non-matching term is preferably automatically replaced with the related term. The user may alternatively be prompted to select the replacement term(s) from a list of terms. Once the non-matching term or terms have been replaced, the modified query is used to perform the search. The user is also preferably notified of the modification(s) made to the query.

An important benefit of the above-described spelling correction method over conventional spelling correction methods is that the selected replacement terms are considerably more likely to be the terms that were intended by the user. This benefit results from the above-described use of search term correlation data, and particularly correlation data that reflects historical query submissions. The method thereby increases the likelihood that the query result will contain items that are of interest to the user. Another benefit is that the method is well suited for correcting terms that do not appear in the dictionary, such as proper names of authors and artists and fanciful terms within titles and product names.

In accordance with another aspect of the invention, the correlation data is preferably generated such that it heavily reflects recent query submissions, and thus strongly reflects the current preferences of users. This may be accomplished, for example, by periodically generating a correlation table from a desired number (e.g., 12) of the most recent daily query logs. Using correlation data that heavily reflects recent query submissions further increases the likelihood that replacements made by the spelling correction process will be those intended by users.

BRIEF DESCRIPTION OF THE DRAWINGS

These and other features of the invention will now be described with reference to the drawings summarized below. These drawings and the associated description are provided to illustrate a preferred embodiment of the invention, and not to limit the scope of the invention.

FIG. 2 illustrates a book search page of the Web site.

FIG. 3 illustrates the general format of the correlation table of FIG. 1.

FIG. 5 illustrates the general format of the query log of FIG. 1.

DETAILED DESCRIPTION OF PREFERRED EMBODIMENTS

The present invention provides a method for correcting spelling errors in queries that are submitted to search engines. Briefly, the method involves using search term correlation data to identify search terms that are related to the correctly spelled search term(s) of the query, and evaluating whether any of these related terms has a similar spelling to the misspelled search term(s). The search term correlation data is preferably based on historical query submissions, and more specifically, on the frequencies with which search terms have previously occurred together within the same query. The method may be implemented within any of a variety of different types of search engines, including, for example, Internet search engines, legal research search engines, and search engines provided by online merchants.

For purposes of illustration, the method is described herein in the context of a search engine that is used to assist customers of Amazon.com Inc. in locating items (books, CDs, etc.) from an online catalog of products. Throughout the description, reference will be made to various implementation-specific details of the Amazon.com implementation. These details are provided in order to fully illustrate a preferred embodiment of the invention, and not to limit the scope of the invention. The scope of the invention is set forth in the appended claims.

I. Overview of Web Site and Search Engine

Figure 1:
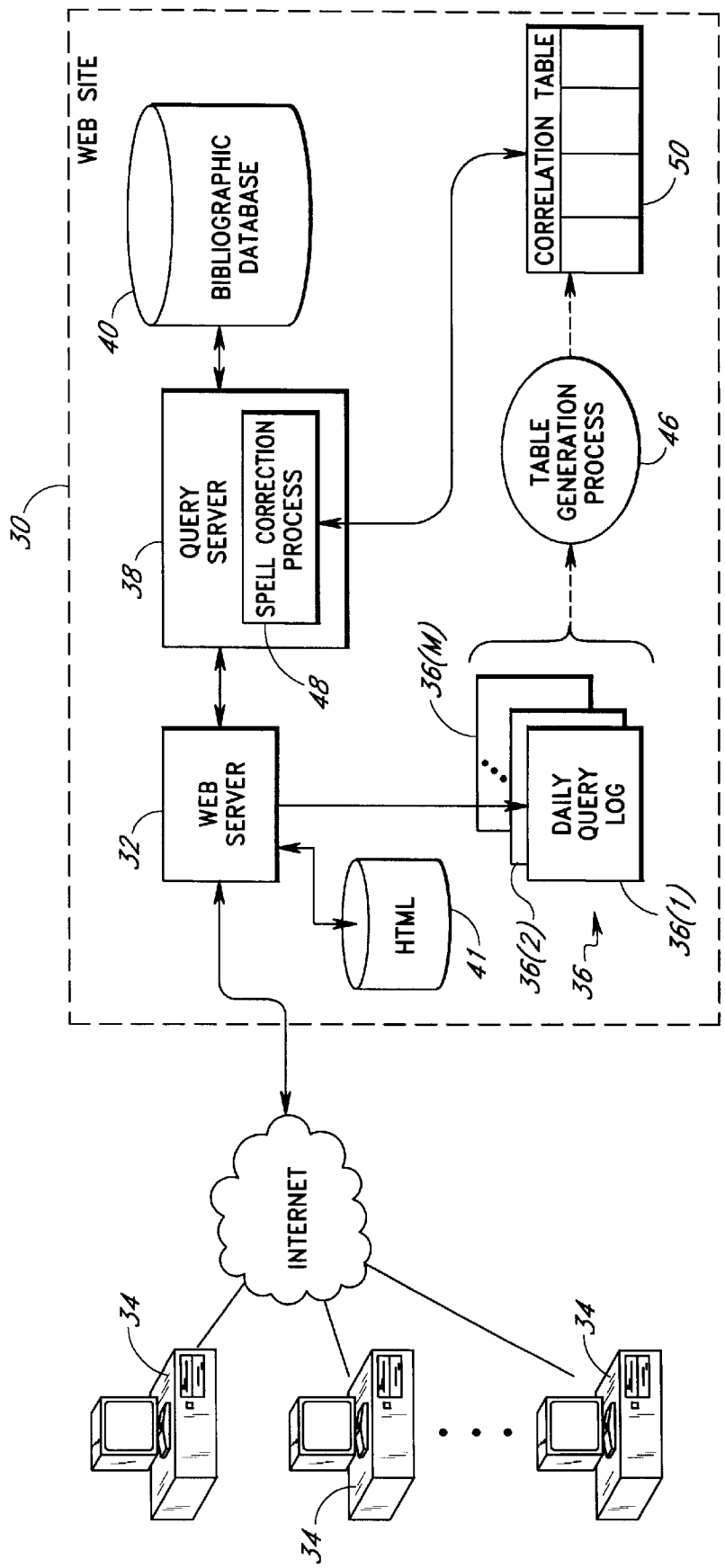
FIG. 1 illustrates a Web site which implements a search engine in accordance with the invention.

FIG. 1 illustrates the Amazon.com Web site 30, including components used to implement a search engine in accordance with the invention. As is well known in the art of Internet commerce, the Amazon.com Web site includes functionality for allowing users to search, browse, and make purchases from an online catalog of book titles, music titles, and other types of items. Because the catalog contains millions of browsable items, it is important that the site provide an efficient mechanism for assisting users in locating items.

As illustrated by FIG. 1, the Web site 30 includes a Web server application 32 ("Web server") which processes requests received over the Internet from user computers 34. These requests include search queries that are submitted by users to search the catalog for products. The Web server 32 records user transactions, including query submissions, within a query log 36. In the embodiment depicted in FIG. 1, the query log 36 consists of a sequence of daily query log files 36, each of which represents one day of transactions.

The Web site 30 also includes query server 38 which processes the search queries by searching a bibliographic database 40. The bibliographic database 40 includes information about the various items that are available for purchase from the site. This information includes, for example, the titles, authors, publishers, subject descriptions and ISBNs (International Standard Book Numbers) of book titles, and the titles, artists, labels, and music classifications of music titles. The information for each item is arranged within fields (such as an "author" field and a "title" field), enabling the database 40 to be searched on a field-restricted basis. The site also includes a database 41 of HTML (Hypertext Markup Language) content which includes, among other things, product information pages which show and describe the various catalog items.

FIG. 2 illustrates the general format of a book search page that can be used to search the bibliographic database 40 for book titles. The page includes author, title and subject fields 42, 43, 44 and associated controls that allow the user to initiate field-restricted searches for book titles. Users can also access a music search page (not shown) to search for music titles using the artist, title and label fields. Other areas of the site allow the user to submit search queries without limiting the search terms to specific database fields.

When the user submits a search query from the book search page or another page of the site, the query server 38 (FIG. 1) applies the query to the bibliographic database 40, taking into account any field restrictions within the query. If the query result is a single item, the item's product information page is presented to the user. If the query result includes multiple items, a list of the items is presented to the user through one or more search results pages (not shown) which include hypertextual links to the items' respective product information pages.

For multiple-term queries, the query server 38 effectively logically ANDs the search terms together to perform the search. For example, if the user enters the terms "Java" and "programming" into the title field, the query server 38 will search for and return a listing of all items that have both of these terms within the title. Thus, if any search term of the query does not produce a match (referred to herein as a "non-matching term"), the query will produce a null query result. In this event, the user may be presented with a listing of items that are deemed to be "close matches."

Although the search engine described herein logically ANDs the search terms together, it will be recognized that the invention can be applied to search engines that use other methods for combining search terms.

II. Overview of Spelling Correction Feature

In accordance with the invention, when a user submits a multiple-term search query that includes both matching and non-matching terms, a spell correction process 48 (FIG. 1) of the query server 38 uses the matching term(s), in combination with search term correlation data, to attempt to correct the spelling of the non-matching term(s). This is preferably accomplished by using a search term correlation table 50 to identify additional terms that are deemed to be related to the matching search term(s), and then comparing the spellings of such related terms to the spelling(s) of the non-matching term(s). For example, if a user submits the query Java APPI, and "APPI" is a non-matching term, the spell correction process 48 uses the correlation table to identify a list of terms that are deemed to be related to "Java." This list might be as follows: coffee, programming, API, management, language. Upon comparing the spellings of these related terms to the spelling of the non-matching term, the spell correction process 48 will identify "API" as a candidate replacement term. The spelling comparisons are preferably performed using an anagram-type spelling comparison function which generates a score that indicates the degree of similarity between two character strings.

The data contained within the correlation table 50 indicates relationships between search terms, and is used to effectively predict search terms that are likely to appear within the same query. Incorporating such predictions into the spelling correction process significantly increases the likelihood that a given replacement term identified by the process will be the term that was intended by the user.

If the above process identifies a suitable replacement for a given non-matching term, the non-matching term is automatically replaced with the related term. If no suitable replacement is found for a given non-matching term, the non-matching term is preferably deleted from the query. Once all of the non-matching terms have either been replaced or deleted, the modified query is used to search the bibliographic database 40 and the result is presented to the user. The user is also notified of the modification(s) made to the search query.

As an alternative to automatically replacing the non-matching term(s), the user may be prompted to select the replacement term(s) from a list of candidate replacement terms. This is preferably accomplished by presenting each candidate replacement term as a respective hyperlink (not shown) which can be selected by the user to initiate the modified search; the user can thus both select a modified query and initiate a new search with a single action.

In accordance with another aspect of the invention, the correlation table 50 preferably contains or reflects historical information about the frequencies with which specific search terms have appeared together within the same search query. As depicted in FIG. 1, this data is preferably extracted from the query log 36 using a table generation process 46. Incorporating such historical information into the spell correction process further increases the likelihood that a replacement term located by the process will be the term that was intended by the user.

In one embodiment (described below), the table generation process 46 regenerates the correlation table 50 on a daily basis from the M most recent daily log files 36(1)–36(M), where M is a fixed number such as ten or twenty. This "sliding window" approach advantageously produces a correlation table that is based only on recent query submissions, and which thus reflects the current preferences of users. For example, if a relatively large number of users have searched for the book *Into Thin Air* by Jon Krakauer over the past week, the correlations between the terms "into," "thin," "air," and "Krakauer" will likely be correspondingly high; these high correlations will in-turn increase the likelihood that a user who misspells a term (of a multiple-term query) while searching for this book will be directed to the book. Any of a variety of other types of biasing methods can be applied to the log to achieve a similar result, including other methods which apply a greater weight to recent query submissions over aged query submissions.

FIG. 3 illustrates the general format of the correlation table 50. In the embodiment depicted in FIG. 3 and described in detail herein, the correlations between search terms are based solely on frequency of occurrence within the same query. As described below, other types of search term correlations can additionally or alternatively be used. In addition, although the disclosed implementation uses a table to store the correlation data, other types of databases can be used.

As illustrated by FIG. 3, each entry within the correlation table (3 entries shown) preferably has two primary components: (1) a keyword 60, and (2) a "related terms" list 62 for that keyword. The related terms list 62 is a list of the N (e.g. 20) search terms that have appeared within the same query as the keyword with the highest degree of frequency, and is ordered according to frequency. For example, the entry for the keyword COSMOS is:

COSMOS: ASTRONOMY, SAGAN, UNIVERSE, SPACE, CARL . . .

indicating that ASTRONOMY has appeared together with COSMOS with the highest degree of frequency; SAGAN has appeared with COSMOS with the second highest degree of frequency, and so on. Each term that appears within the list portion 62 is deemed to be related to the corresponding keyword 60 by virtue of the relatively high frequency with which the terms have occurred within the same query. In the implementation described herein, the keywords and related terms are stored in the table without regard to alphabetic case, although case information can alternatively be preserved.

With further reference to FIG. 3, each related term and each keyword 60 within the table 50 preferably includes a single-character field prefix (not shown) which indicates the search field 42, 43, 44 to which the term corresponds (based on the search fields in which the terms were entered by users). These prefixes may, for example, be as follows: A=author, T=title, S=subject, R=artist, L=label. Thus, for example, if the keyword COSMOS in FIG. 3 has the prefix "T" and the related term SAGAN has the prefix "A," this would indicate that a relatively large number of queries were submitted which included COSMOS in the title field 43 together with SAGAN in the author field 42. As described below, the prefixes of the related terms are used by the spelling correction process 48 to effectively filter out the non-field-corresponding terms from the related terms lists, so that a non-matching term within a given search field will only be compared to related terms of the same field. Thus, for example, a non-matching term within the author field 42 will be compared only to other terms that have historically been entered into the author field 42. The spell correction process 48 similarly uses the prefixes of the keywords 60 to select table entries that correspond to the respective search fields of the matching terms. For example, if an erroneous query is received which includes the matching term MOUNTAIN within the title field 43, the spelling correction process 48 will search for a table entry having the keyword TMOUNTAIN.

As further depicted in FIG. 3, the correlation table 50 also preferably includes correlation scores 64 that indicate the number of times each related term has appeared in combination with the keyword. For example, term PROGRAMMING has a score of 320 in the entry for JAVA, indicating that JAVA and PROGRAMMING appeared within the same query (within the fields indicated by their respective field prefixes) three hundred and twenty times. As described below, queries that produced a null query result are ignored by the table generation process 46, and thus are not reflected in the correlation scores 64. In other implementations, the correlation scores 64 may incorporate other types of correlations. As described below, the scores 64 are preferably used to merge related terms lists when a query has multiple matching terms.

In operation, when the query server 38 determines that a query contains both a matching and a non-matching search term, the spell correction process 48 initially accesses the correlation table 50 to extract the associated related terms list 62. If the query includes multiple matching search terms, the process 48 obtains the related terms lists 62 for each matching term and merges these lists together (as described below) to generate a composite related terms list. As indicated above, the process then compares the spellings of the resulting related terms to the spelling(s) of the non-matching term(s), and either replaces or deletes each non-matching term from the query. During the spelling comparison process, each non-matching term is preferably compared only to those related terms that fall within the non-matching term's search field.

An important benefit of this method is that it is particularly well suited for correcting misspellings of terms that do not appear in the dictionary. The technique is thus particularly useful for identifying items that tend to be characterized by non-dictionary terms. Such items include, for example, products sold by online merchants, court opinions (commonly identified by the names of the parties), and businesses and their Web sites. In the context of an online book/music store, for example, the method is useful for correcting misspellings of proper names of authors/artists and fanciful terms that appear within titles. For example, a user searching for a book by Jon Krakauer might be able to find the book by typing in a few words of the title plus a misspelled version of "Krakauer." The likelihood that the search will identify the desired book will be particularly high if a relatively large number of users have recently searched for the same book.

Although the method preferably uses search term correlations that are based on prior query submissions, it should be understood that the correlation data can alternatively be generated from other sources. For example, the correlation data can be generated by processing the information in the bibliographic database 40 to identify terms that appear together within the same item record, title, item description, book review or other database field; in performing this process, each item can be accorded a weight that is proportional, for example, to the number of units of that item sold over the last week.

In addition, the method can be modified to incorporate other types of correlations, including correlations based on other types of historical user actions. For example, in extracting correlation data from the query log 36, greater weight can be given to query submissions which, based on the users' subsequent actions, can be deemed to have produced a successful query result. Such success can be presumed, for example, if the user views, purchases or adds to a shopping cart an item located by the search.

The disclosed search engine also preferably uses historical query submissions and item selections to rank query results for presentation to the user. A preferred method for ranking search results based on such data is disclosed in U.S. patent application Ser. No. 09/041,081 filed Mar. 10, 1998. The search engine also preferably uses historical query data to identify related search terms for helping the user refine a search query, such as when the search query produces a long list of items. A preferred method for generating and displaying related search terms is disclosed in U.S. Provisional Appl. Ser. No. 60/089,244, filed Jun. 15, 1998. The disclosures of the aforesaid patent applications are hereby incorporated herein by reference in their entirety.

As described in the above-referenced provisional application, the search engine generates and displays related search terms as follows. For a single-term query, the top N related search terms (those with the highest scores) for the query term are simply read from the table 50 and presented to the user, where N can be any desired number. For a multiple-term query, the search engine takes the intersection of the related terms lists 62 for the respective query terms, and presents any resulting terms to the user; for example, if a user conducts a search for "outdoor trail," and the terms "outdoor" and "trail" have the related terms lists 62 indicated below, the intersecting terms "bike" and "sports" would be presented to the user as suggested refinements.

OUTDOOR: BIKE, DINING, EDUCATION, FITNESS, FURNITURE, SPORTS, TRAIL, VACATION

TRAIL: BLAZING, BIKE, MAP, MIX, OUTDOOR, SPORTS, WAGON, YUKON

Each related search term is preferably presented to the user, in conjunction with the search results, using a respective textual link that is selectable to initiate the refined search. In the above example, the user would thus be presented with one link for initiating the refined search "OUTDOOR TRAIL BIKE," and another link for initiating the refined search "OUTDOOR TRAIL SPORTS."

With further reference to FIG. 1, the Web server 32, query server 38, table generation process 46, and database software run on one or more Unix™-based servers and workstations (not shown) of the Web site 30. The correlation table 50 is stored in RAM (random access memory) on the same workstation as that used to implement the query server 38.

III. Query Processing Method

The spelling correction process will now be described in further detail with reference to FIG. 4, which is a flow diagram of the steps performed by the query server 38 (FIG. 1) when a user submits a query. To illustrate this process, it will be assumed that the user is searching for books about hiking the Appalachian Trail and has typed the following query into the subject field 44 (FIG. 2): "hike Appalatian trail." It will also be assumed that "Appalatian" is a non-matching term (although "Appalachian" is matching), and that "hike" and "trail" are matching terms having the following related terms lists:

HIKE: CAMPING (235), WALKS (160), TRAIL (150)

TRAIL: BIKE (200), APPALACHIAN (165), WALKS (50)

It will also be assumed that all of the above keywords and related terms have a field prefix of "S" for "subject."

As indicated by step 70, the query server 38 initially applies the query to bibliographic database 40. As depicted by steps 72 and 74, if one or more items are found, the query server returns a list of these items the Web server 32. The Web server 32 in-turn incorporates this list into one or more search results pages, or, if only one item is located, returns the product information page for that item. In addition, the Web server records the number of items found in the query log 36 (see FIG. 5). In the present example, no items would be found since "Appalatian" does not exist as a subject word in the bibliographic database 40.

If, as in the present example, the number of items found is zero in step 72, the query server 38 determines whether the query includes both matching and non-matching terms (step 76). If it does, the query server 38 invokes its spelling correction process 48 (steps 80–90 in FIG. 4) to attempt to correct the non-matching term(s). If it does not, a message is returned to the user (step 78) indicating that no exact matches were found; in this event, the query server 38 may also generate and return a list of "close matches," which may include items that contain only a subset of the matching terms. The query sever 38 could additionally or alternatively be configured to invoke an alternative spelling correction method (not shown) to attempt to correct any non-matching term(s). In the present example, the spell correction process 48 would be invoked since the query includes both matching and non-matching terms.

The spell correction process begins in step 80 by retrieving the related terms list for each matching term from the correlation table 50. If no related term lists (table entries) are found during step 80, the process preferably returns a null query result message and terminates (not shown). Alternatively, the process could use an alternative spelling correction method to attempt to correct the non-matching term(s), or could generate and return a list of "close matches."

If, as in the present example, the query includes multiple matching terms, the related terms lists for these terms are merged together in step 80 to form a composite related terms list. The lists may be merged, for example, by combining the lists while summing the correlation scores of any intersecting terms (terms which appear in multiple lists), and then sorting the composite list in order of highest-to-lowest frequency score. In the present example, this method would produce the following related terms list: CAMPING (235), WALKS (210), BIKE (200), APPALACHIAN (165), TRAIL (150). The sorted composite list can be truncated to reduce the processing burden of the subsequent steps.

The spell correction process then enters into a loop (steps 84–90) in which the spellings of the non-matching term(s) and the related terms are compared. In each pass of this loop, the process compares a non-matching term to the list of related terms one-by-one (step 84), excluding any related terms having field prefixes that do not correspond to the search field of the non-matching term. The comparisons are performed using an anagram-type function which compares two character strings and returns a numerical similarity score. The similarity score indicates the degree of similarity between the spellings of the two strings, and thus indicates the likelihood that the given related term is a suitable replacement for the current non-matching term. A similarity score of zero indicates the highest degree of similarity, and progressively higher scores indicate progressively lower degrees of similarity.

The steps performed by the spelling comparison function to compare STRING1 to STRING2 are set forth below, in which the variable RESULT represents the score that is returned by the function. A code listing of a C++ implementation of the method (implemented as two separate functions) is attached as an appendix.

Step 1: Sort STRING1 and STRING2 in alphabetical order.

Step 2: Initialize POINTER1 to first character of sorted STRING1; POINTER2 to first character of sorted STRING2; and RESULT to zero.

Step 3: Compare respective characters pointed to by POINTER1 and POINTER2 without regard to case. If equal, advance both pointers to next character of string; else, advance pointer which points to alphabetically lower character and increment RESULT by 1.

Step 4: Repeat step 3 until a pointer is advanced beyond the last character of its respective string.

Step 5: If one of the pointers is still pointing to a character, add to RESULT the number of characters (including the pointed-to character) remaining in that string.

In the present example, step 84 results in the non-matching term APPALATIAN being compared to the terms CAMPING, WALKS, BIKE, APPALACHIAN, and TRAIL. The scores generated by these comparisons are listed in the table below.

TABLE

| RELATED TERM | SORTED STRING COMPARED TO "AAAAILNPPT" | SIMILARITY SCORE |
| --- | --- | --- |
| CAMPING | ACGIMNP | 9 |
| WALKS | AKLSW | 11 |
| BIKE | BEIK | 12 |
| APPALACHIAN | AAAACHILNPP | 3 |
| TRAIL | AILRT | 7 |

In step 86, the scores are evaluated to determine whether any of the related terms has a sufficiently similar spelling to be a candidate replacement term. In the preferred embodiment, a related term is deemed to be similar (and thus a candidate replacement) if its score is less than or equal to half the length of the non-matching term (the "similarity threshold"). In the present example, the term "Appalachian" satisfies the similarity test (since $3 \leq 5$) and the remaining related terms do not.

To increase the efficiency of the spelling comparison function, processing in step 3 can be halted once RESULT exceeds the similarity threshold. Efficiency could also be increased by halting the processing of additional terms once a term with a sufficiently low score (e.g., 0) has been identified.

If at least one related term satisfies the similarity test in step 86, the non-matching term is replaced with related term having the lowest score (step 88). If multiple related terms share the lowest score in step 88, the term which falls first in the related terms list (and thus has the highest frequency score) is used as the replacement.

If none of the related terms satisfies the similarity test in step 86, the non-matching term is deleted from the query. Alternatively, a null query result message could be returned to the user at this point. Once all of the non-matching terms have been either replaced or deleted, the search is re-attempted using the modified query and the result is returned to the user (step 94).

If the re-attempted search in step 94 produces one or more items, the items are presented together with a message indicating the modification(s) made to the query. In the present example, this message might read as follows:

No books were found which include the subject word "Appalatian." However, we reattempted your search using the term "Appalachian" in place of "Appalatian" and found the following titles.

The search results page also preferably displays and allows the user to edit the modified query, so that the user can effectively reject the search term replacement(s) and/or otherwise revise the query.

If the re-attempted search in step 94 does not produce any exact matches, the user may be presented with a list of close matches, or may simply be notified that no matches were found. As an alternative, additional replacements and searches can be attempted.

Figure 4:
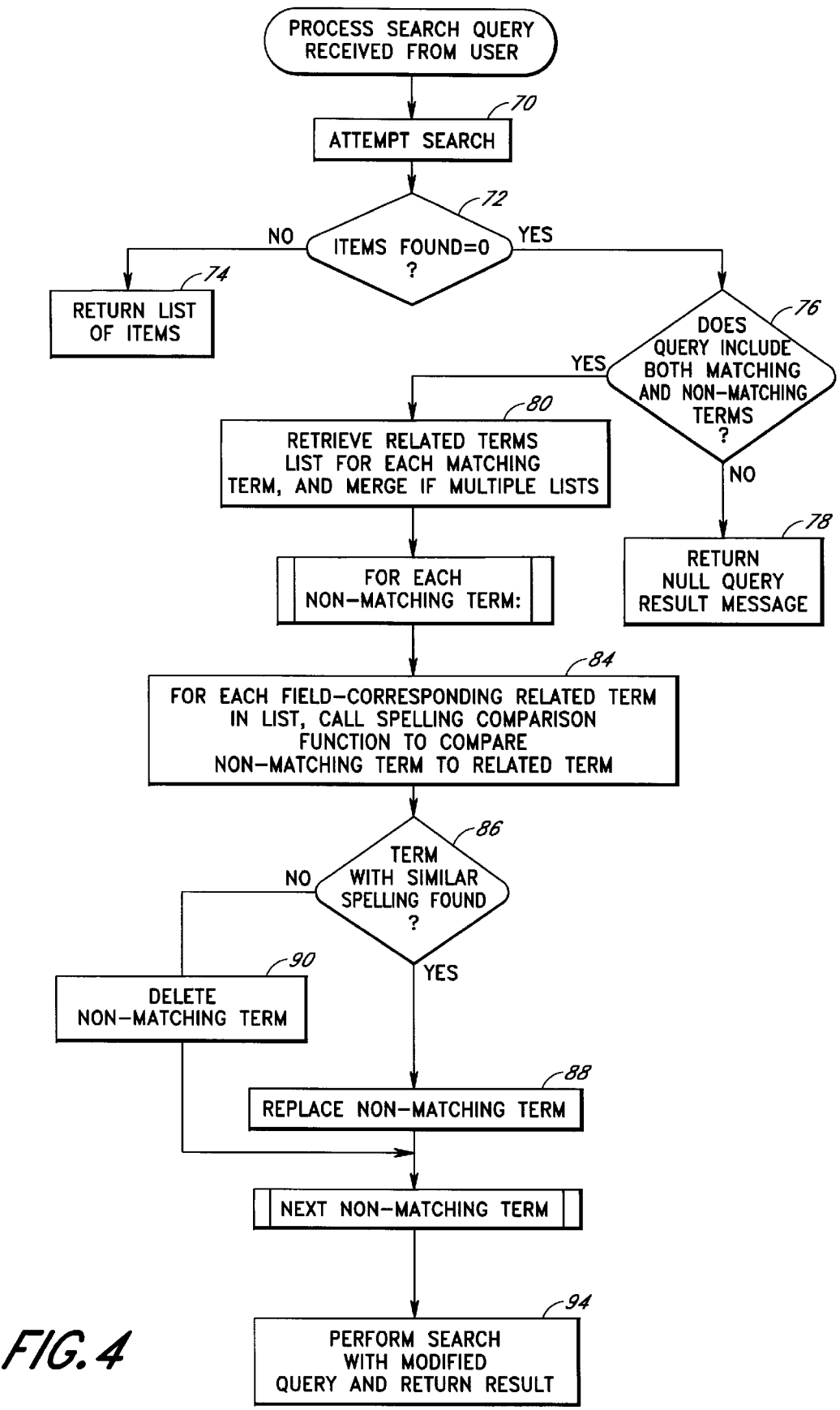
FIG. 4 illustrates the steps performed by the query server to process a query submission.

As will be appreciated from the foregoing, the FIG. 4 process can be altered in any of variety of ways to achieve a desired objective. For example, separate correlation tables could be generated and used for different types of items (e.g., books v. music) and/or different types of fields (e.g., title v. subject). Further, the spell correction process could be used only to correct misspellings within a specific field (such as the author field 42), or could be applied only to non-matching terms that do not appear within a dictionary of terms.

IV. Generation of Correlation Table

The table generation process 46 (FIG. 1) will now be described with reference to FIGS. 5 and 6.

The table generation process 46 is implemented as an off-line process which is executed periodically, such as once per day, to generate a new correlation table 50. As described above, the process generates the table from the M most recent daily query log files 36(1)–36(M). Using a relatively small M (e.g. 5) tends to produce correlation data that heavily reflects short term buying trends (e.g., new releases, weekly best-sellers, etc.), while using a larger M (e.g., 100) tends to produce a more comprehensive database. A hybrid approach can alternatively be used in which the table is generated from large number of log files, but in which the most recent log files are given greater weight. For example, queries submitted during the last week can be counted three times when generating the correlation scores 64, while queries submitted from one week to one month ago can be counted only once.

FIG. 5 illustrates the general format of the query log files. Each entry in the log (four entries shown) includes information about a particular HTTP (Hypertext Transfer Protocol) transaction. For example, entry 100 indicates that at 2:23 AM on Feb. 13, 1998, user 29384719287 submitted the query {author=Seagal, title=Human Dynamics} from the book search page and that two items were found that matched the query. The ITEMS_FOUND values in the log preferably indicate the number items that exactly matched the original query, and thus do not reflect either "close matches" or matches resulting from spelling corrections.

Entry 102 indicates that the same user selected an item having an ISBN of 1883823064 about twenty seconds later, and that this selection was made from a search results page (as is evident from the "HTTP_REFERRER line). Other types of user actions, such as a request to place an item in a shopping cart or to purchase an item, are similarly reflected within the log files. As indicated by the above example, a given user's navigation path can be determined by comparing entries within the log 36.

Figure 6:
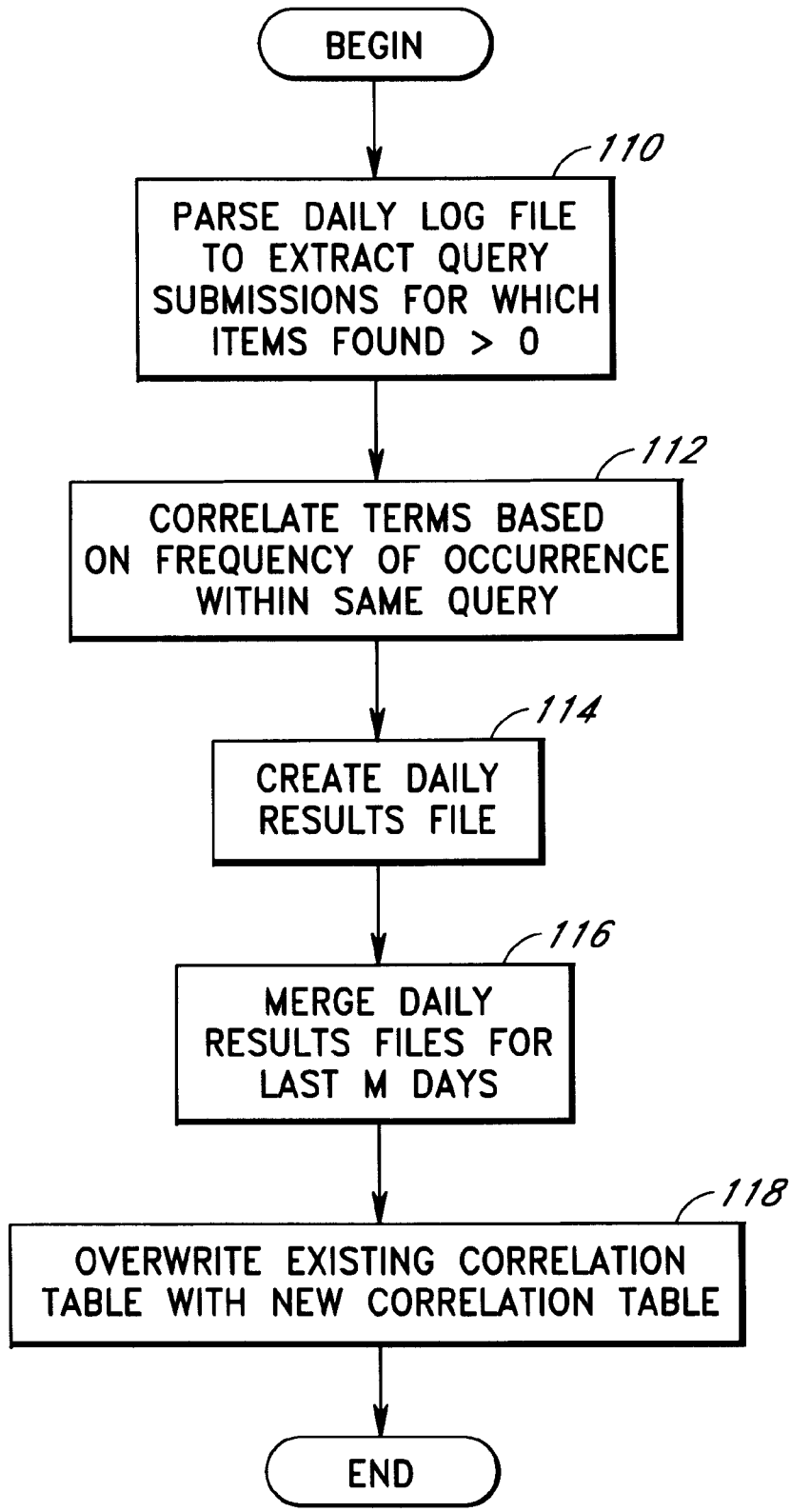
FIG. 6 illustrates a process used to periodically generate the correlation table from the query log.

FIG. 6 illustrates the sequence of steps performed by the table generation process 46. In this example, it is assumed that the process is executed once per day at midnight, just after the most recent daily log file is closed. It is also assumed that the M−1 most recent daily log files have already been processed using steps 110–114 of the process to generate respective daily results files.

In step 110, the process parses the new daily log file to extract all query submissions for which ITEMS_FOUND>0. Ignoring the query submissions that produced null query result (ITEMS_FOUND=0) provides the important benefits of (1) preventing non-matching terms from being added to the correlation table—either as keywords or as related terms—and (2) excluding potentially "weak" correlations between matching terms from consideration.

In step 112, the entries extracted in step 110 are processed to correlate search terms by frequency of occurrence within the same query. This step involves counting, for each pair of search terms that appeared within the same query at least once, the number of times the two terms appeared together throughout the day. During this process, identical terms that were submitted in different search fields are treated as different terms. For example, the term TRAIL with a field prefix of "T" would be treated as different from TRAIL with a prefix of "S."

As indicated above, any of a variety of other factors can be taken into consideration during the step 112 process. For example, a given query submission can be counted twice if the user subsequently selected an item from the search results page, and counted a third time if the user then purchased the item or added the item to a personal shopping cart. Extrinsic correlation data can also be incorporated into the process. The results of step 112, which are in the general form of the FIG. 3 correlation table, are saved as a daily results file.

In step 116, the daily results file created in step 114 is merged with the last M−1 daily results files to produce the correlation table 50. As part of this process, the related terms lists are truncated to a fixed length of N, and the resulting correlation data is stored in a B-tree data structure for efficient look-up. The new correlation table 50 is then written to RAM in place of the existing correlation table.

Although this invention has been described in terms of certain preferred embodiments, other embodiments that are apparent to those of ordinary skill in the art are also within the scope of this invention. Accordingly, the scope of the present invention is intended to be defined only by reference to the appended claims.

In the claims which follow, reference characters used to denote process steps are provided for convenience of description only, and not to imply a particular order for performing the steps.

---

APPENDIX

```
char *sort_string(char *string_to_sort) {
    qsort(string_to_sort, strlen(string_to_sort),
        sizeof(char), qsort_char_compare);
    return string_to_sort;
}
int score_sorted_strings(char* string1, char* string2) {
    int result = 0;
    int finished = FALSE;
    int compare = 0;
    unsigned char* str1_ptr = (unsigned char*) string1;
    unsigned char* str2_ptr = (unsigned char*) string2;
    while (!finished) {
        if (*str1_ptr == 0 || *str2_ptr == 0)
            finished = TRUE;
        /* The scoring function compares two characters; if they are the
            same, both pointers are incremented to move on, otherwise
            only the lesser pointer is incremented and
            compared again */
        if (!finished) {
            compare = qsort_char_compare((void*)
                str1_ptr, (void*)str2_ptr);
            if ( compare < 0) {
                str1_ptr++;
                result++;
            } else if ( compare > 0) {
                str2_ptr++;
                result++;
            } else if ( compare == 0) {
                str1_ptr++;
                str2_ptr++;
            }
        }
    }
    /* Add to the score any remaining results */
    while (*str1_ptr++ != NULL) {
        result++;
    }
    while (*str2_ptr++ != NULL) {
        result++;
    }
    return result;
}
```

---

What is claimed is:

1. In a computer system that implements a search engine that is accessible to users over a computer network, a method of handling misspelled search terms in search queries, the method comprising the computer-implemented steps of:

(a) processing search queries submitted to the search engine by a plurality of users over a period of time to generate correlation data, the correlation data indicating correlations between search terms based at least upon frequencies of prior occurrences of the search terms within the same search query;

(b) receiving a search query from a user over the computer network, the search query comprising a plurality of search terms and being directed to an informational database to be searched;

(c) identifying within the search query a non-matching search term which does not produce a match within the informational database, and at least one matching search term which produces a match within the informational database;

(d) using at least the correlation data to identify a plurality of additional terms that are deemed to be related to the at least one matching search term; and (e) comparing the additional terms identified in step (d) to the non-matching term to identify an additional term that is a candidate correctly-spelled replacement term for the non-matching term.

2. The method of claim 1, further comprising the computer-implemented steps of:

(f) without requiring user input, replacing the non-matching term with the candidate replacement term within the search query to generate a modified search query;

(g) applying the modified search query to the informational database to perform a search; and (h) notifying the user of the query result of step (g) and of the replacement made in step (f).

3. The method of claim 1, wherein step (a) comprises updating the correlation data substantially in real time as search queries are received from users.

4. The method of claim 1, wherein step (a) comprises parsing a log that includes queries submitted to the search engine.

5. The method of claim 4, wherein step (a) further comprises applying a time-based biasing function to the log to favor recent search query submissions over aged search query submissions.

6. The method of claim 5, wherein the step of applying a time-based biasing function comprises applying a window function to the log.

7. The method of claim 1, wherein step (a) comprises ignoring search queries that produce a null query result.

8. The method of claim 1, wherein step (a) further comprises evaluating post-query-submission actions of users to identify search queries that are deemed to have produced a successful result, and weighing the search queries that produced a successful result more heavily in generating the correlation data.

9. The method of claim 1, wherein step (c) comprises identifying a plurality of non-matching search terms within the search query, and the method comprises repeating step (e) for each of the non-matching search terms to identify a candidate replacement term for each non-matching search term.

10. The method of claim 1, wherein step (d) comprises:

(d1) for each of a plurality of matching search terms, identifying a respective list of related terms; and (d2) combining the lists of related terms of identified in step (d1).

11. The method of claim 1, wherein step (e) comprises using a spelling comparison function to compare the non-matching term to the additional terms, the spelling comparison function adapted to compare first and second character strings by sorting the first and second strings and comparing the sorted first and second strings on a character-by-character basis.

12. The method of claim 11, wherein the spelling comparison function generates a score which indicates a degree of similarity between the first and second character strings, and wherein step (e) further comprises comparing a score generated by the scoring function to a threshold value to determine whether a corresponding additional term is a candidate replacement, the threshold value dependent upon a number of characters in the non-matching term.

13. The method of claim 1, wherein step (e) comprises identifying a plurality of candidate correctly-spelled replacement terms for the non-matching term, and the method further comprises presenting the user with a list of the candidate replacement terms for selection.

14. The method of claim 13, wherein the step of presenting the user with a list comprises presenting each candidate replacement term within a respective hyperlink which can be selected by the user to initiate a modified search.

15. The method of claim 1, wherein the computer system is part of a Web site, and the informational database includes information about products that are available for purchase via the Web site.

16. In a computer system that implements a search engine that is accessible to users over a computer network, a method of processing a search query that includes at least one misspelled search term, the method comprising the computer-implemented steps of:

(a) receiving the search query from a user over the computer network, the search query comprising a plurality of search terms and being directed to an informational database to be searched;

(b) identifying within the search query a non-matching search term which does not produce a match within the informational database, and at least one matching search term which produces a match within the informational database;

(c) using search term correlation data to identify a plurality of additional terms that are deemed to be related to the at least one matching search term, the search term correlation data based at least on historical query submissions; and (d) comparing the additional terms identified in step (c) to the non-matching term to identify an additional term that is a candidate correctly-spelled replacement for the non-matching term.

17. The method of claim 16, wherein the search term correlation data is based at least on frequencies with which search terms have previously occurred within the same query.

18. The method of claim 16, further comprising the step of processing historical query submissions within a log to generate the search term correlation data.

19. The method of claim 18, wherein the step of processing historical query submissions comprises applying a window function to the log.

20. The method of claim 18, wherein the step of processing historical query submissions comprises ignoring queries that produced null query results.

21. The method of claim 16, further comprising the computer-implemented steps of:

(e) without requiring user input, replacing the non-matching term with the candidate replacement term within the search query to generate a modified search query;

(f) applying the modified search query to the informational database to perform a search; and (g) notifying the user of the query result of step (f) and of the replacement made in step (e).

22. The method of claim 16, wherein step (d) comprises using a spelling comparison function to compare the non-matching term to the additional terms, the spelling comparison function adapted to compare first and second character strings by sorting the first and second strings and comparing the sorted first and second strings on a character-by-character basis.

23. The method of claim 22, wherein the spelling comparison function generates a score which indicates a degree of similarity between the first and second character strings, and wherein step (d) further comprises comparing a score generated by the scoring function to a threshold value to determine whether a corresponding additional term is a candidate replacement, the threshold value dependent upon a length of the non-matching term.

24. A search engine for allowing users of a computer network to conduct searches of a database of items, the search engine comprising:
  a computer system which has search term correlation data stored in a memory thereof, the search term correlation data indicating correlations between search terms based at least upon prior query submissions of users; and
  a query server which runs on the computer system, the query server adapted to search the database of items using search queries received from users, the query server configured to process a multi-term search query that includes both matching and non-matching terms by at least:
    accessing the search term correlation data to identify a plurality of additional terms that are deemed to be related to the matching terms(s) of the search query; and
    comparing the spellings of the additional terms to the spelling of at least one non-matching term of the query to determine whether any of the additional terms is a candidate replacement for the non-matching term.

25. The search engine of claim 24, wherein the search term correlation data is based at least on frequencies with which search terms have previously occurred within the same query.

26. The search engine of claim 24, wherein the query server is configured to, without requiring user input:
  replace a non-matching term with an additional term to generate a modified query; and
  search the database of items with the modified query.

27. The search engine of claim 24, wherein the query server compares the additional terms to the non-matching term using a spelling comparison function, the spelling comparison function adapted to compare first and second character strings by sorting the first and second strings and comparing the sorted first and second strings on a character-by-character basis.

28. The search engine of claim 27, wherein the spelling comparison function generates a score which indicates a degree of similarity between the first and second character strings, and wherein the query server compares a score generated by the scoring function to a threshold value to determine whether a corresponding additional term is a candidate replacement.

29. The method as in claim 1, further comprising the steps of:
  (f) receiving a second search query from a second user;
  (g) using at least the second search query and the correlation data to identify a set of related search terms; and
  (h) presenting the set of related search terms to the second user, in conjunction with search results, as suggested refinements to the second search query.

30. The method as in claim 29, wherein the second search query comprises multiple search terms, and step (g) comprises using the correlation data to identify terms that are related to each of the miltiple search terms.

31. The method as in claim 29, wherein step (h) comprises presenting each related search term using a respective textual link that is selectable to initiate a refined search.

* * * * *

UNITED STATES PATENT AND TRADEMARK OFFICE
CERTIFICATE OF CORRECTION

PATENT NO. : 6,144,958
DATED : November 7, 2000
INVENTOR(S) : Ortega et al.

It is certified that error appears in the above-identified patent and that said Letters Patent is hereby corrected as shown below:

Column 16,
Line 27, "miltiple" should be changed to -- multiple --.

Signed and Sealed this

Nineteenth Day of February, 2002

Attest:

JAMES E. ROGAN
Attesting Officer  Director of the United States Patent and Trademark Office